United States Patent
Parsa

(10) Patent No.: US 6,931,106 B2
(45) Date of Patent: Aug. 16, 2005

(54) SYSTEM AND METHOD FOR USING VOICE-MESSAGING SYSTEM TO PLACE LOCAL AND LONG DISTANCE TELEPHONE CALLS

(75) Inventor: Ferial Parsa, Paradise Valley, AZ (US)

(73) Assignee: Qwest Communications International Inc., Denver, CO (US)

( * ) Notice: Subject to any disclaimer, the term of this patent is extended or adjusted under 35 U.S.C. 154(b) by 110 days.

(21) Appl. No.: 09/998,557

(22) Filed: Nov. 29, 2001

(65) Prior Publication Data

US 2003/0099332 A1 May 29, 2003

(51) Int. Cl.[7] ............................................. H04M 11/00
(52) U.S. Cl. ............................. 379/88.18; 379/114.01; 455/413
(58) Field of Search .................... 379/88.18, 88.25, 379/114.01, 114.04, 88.17, 88.19, 114.22, 142.07, 201.05, 67.1, 88.16, 221.01, 207.06, 230, 88.04, 221.02; 455/413, 557; 715/531

(56) References Cited

U.S. PATENT DOCUMENTS

| | | | | |
|---|---|---|---|---|
| 5,187,735 A | * | 2/1993 | Herrero Garcia et al. | ........................ 379/88.17 |
| 5,550,899 A | * | 8/1996 | McLeod et al. | ......... 379/88.25 |
| 5,745,553 A | * | 4/1998 | Mirville et al. | ........ 379/201.05 |
| 5,937,047 A | * | 8/1999 | Stabler | ...................... 379/67.1 |
| 6,160,883 A | * | 12/2000 | Jackson et al. | ........ 379/221.01 |
| 6,332,085 B1 | * | 12/2001 | Hanson et al. | .............. 455/557 |
| 6,404,877 B1 | * | 6/2002 | Bolduc et al. | ........... 379/88.16 |
| 6,477,551 B1 | * | 11/2002 | Johnson et al. | ............. 715/531 |

* cited by examiner

*Primary Examiner*—Fan Tsang
*Assistant Examiner*—Gerald Gauthier
(74) *Attorney, Agent, or Firm*—Townsend and Townsend and Crew LLP

(57) ABSTRACT

Systems and methods for using a voice-messaging system to place local and long distance telephone calls. In the invention, a voice-messaging system receives a toll-free call placed by a user and verifies that the user is a valid user of the voice-messaging system by accepting a pass code. The voice-messaging system then accepts the user's request to place a telephone call and the number to be called. Finally, the system places a call to the third party and connects the telephone call to the third-party telephone line if the third-party telephone line is available.

1 Claim, 2 Drawing Sheets

SYSTEM AND METHOD FOR USING VOICE-MESSAGING SYSTEM TO PLACE LOCAL AND LONG DISTANCE TELEPHONE CALLS

BACKGROUND OF THE INVENTION

The present invention relates generally to a voice-messaging system, and more particularly to systems and methods for using a voice-messaging system to place local and long distance telephone calls.

Current methods of placing calls outside of the home include placing collect calls, calling 10—10 numbers, or using credit cards, "calling cards" or cash. These methods have several disadvantages. For example, collect calls are expensive and are billed to the person called and not to the person placing the call. Calling 10—10 number also can be expensive, and the charges typically must be billed to a credit card, thus making it similar to credit card call.

Credit cards or calling cards generally require a full account number to be entered before placing a call, and thus require a person to either memorize account numbers or carry these cards along. Furthermore, calls placed with credit cards or calling cards are relatively expensive as compared to calls placed from a caller's home phone and are often billed separately from the customer's home phone bill. In addition, not all phones accept all types of cards.

Use of coins in many cases can also be impractical and inconvenient. Most importantly, not all phones accept coins, and in those that do, a long distance call would require many coins and even a local call would require several coins for a longer conversation.

Thus, a need exists for a means to place local and long distance calls from a phone outside the home in a more convenient and less expensive manner.

BRIEF DESCRIPTION OF THE DRAWINGS

The present invention is described in conjunction with the appended figures.

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

The present invention relates generally to a voice-messaging system, and more particularly to systems and methods for using a voice-messaging system to place local and long distance telephone calls.

Figure 1:
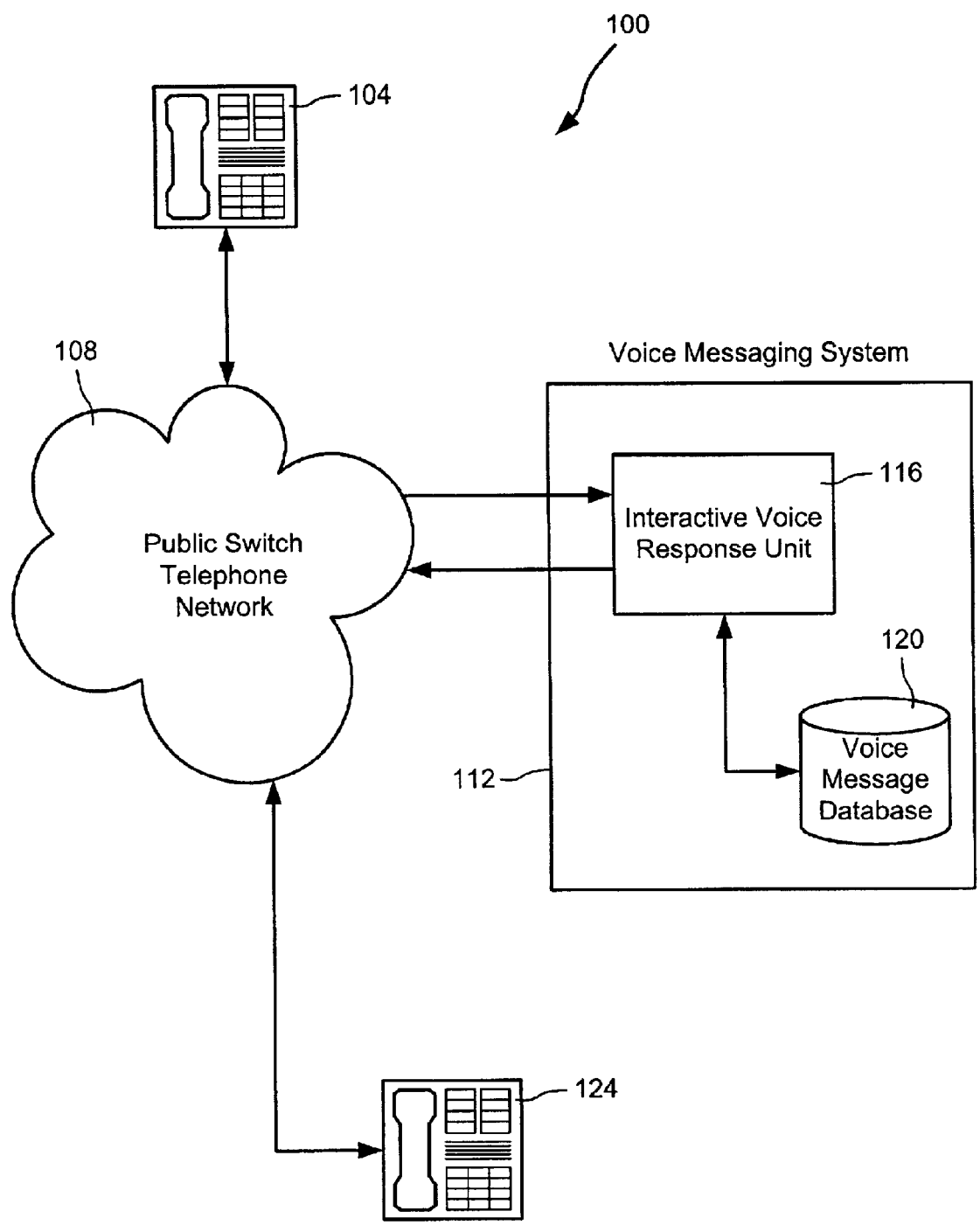
FIG. 1 is a block diagram of a telephone system having voice-messaging capabilities.

Referring now to FIG. 1, one embodiment of a telephone system 100 having voice-messaging capabilities is illustrated. In the illustrated embodiment, a customer or user may place a call to voice-messaging system 112, for example, using a user telephone 104. In one embodiment, the call placed to the voice-messaging system is a toll-free call. The customer's or user's phone 104 can be a public phone or a private phone, and may comprise any device for placing telephone calls, such as standard telephones, cell phones, computers, PDAs, etc.

The call is routed through a public switch telephone network 108, where it is then directed to voice-messaging system 112. Voice-messaging system 112 comprises an interactive-voice-response unit 116 and a database for storing voice messages 120. The interactive-voice-response unit 116 can be any computer or computing device configured to receive calls, process voice-messaging options, and record messages to and retrieve messages from voice message database 120. In addition, in accordance with one embodiment, voice-response unit 116 may be configured to place calls to third parties.

As discussed in more detail below with reference to FIG. 2, once voice message system 112 receives the call from the customer or user, the interactive voice-response unit 116 either allows the user to retrieve voice messages as is well known in the art, or allows the user to place a third-party call. As one skilled in the art will appreciate, voice-response unit 116 will process option selections entered by the user.

If the user chooses to place a third-party call, the interactive voice-response unit 116 places the call, for example through a public-switch-telephone network 108, where it then is routed to a third-party phone 124 for connection. The third-party phone 124 can be a public or private phone, and may comprise any device for receiving telephone calls, such as standard telephones, cell phones, computers, PDAs, etc. At any point during or after the phonecall, or if the call is not connected, the user has the option of returning to the voice-messaging system 112 to place another call or to retrieve his/her voice messages.

Figure 2:
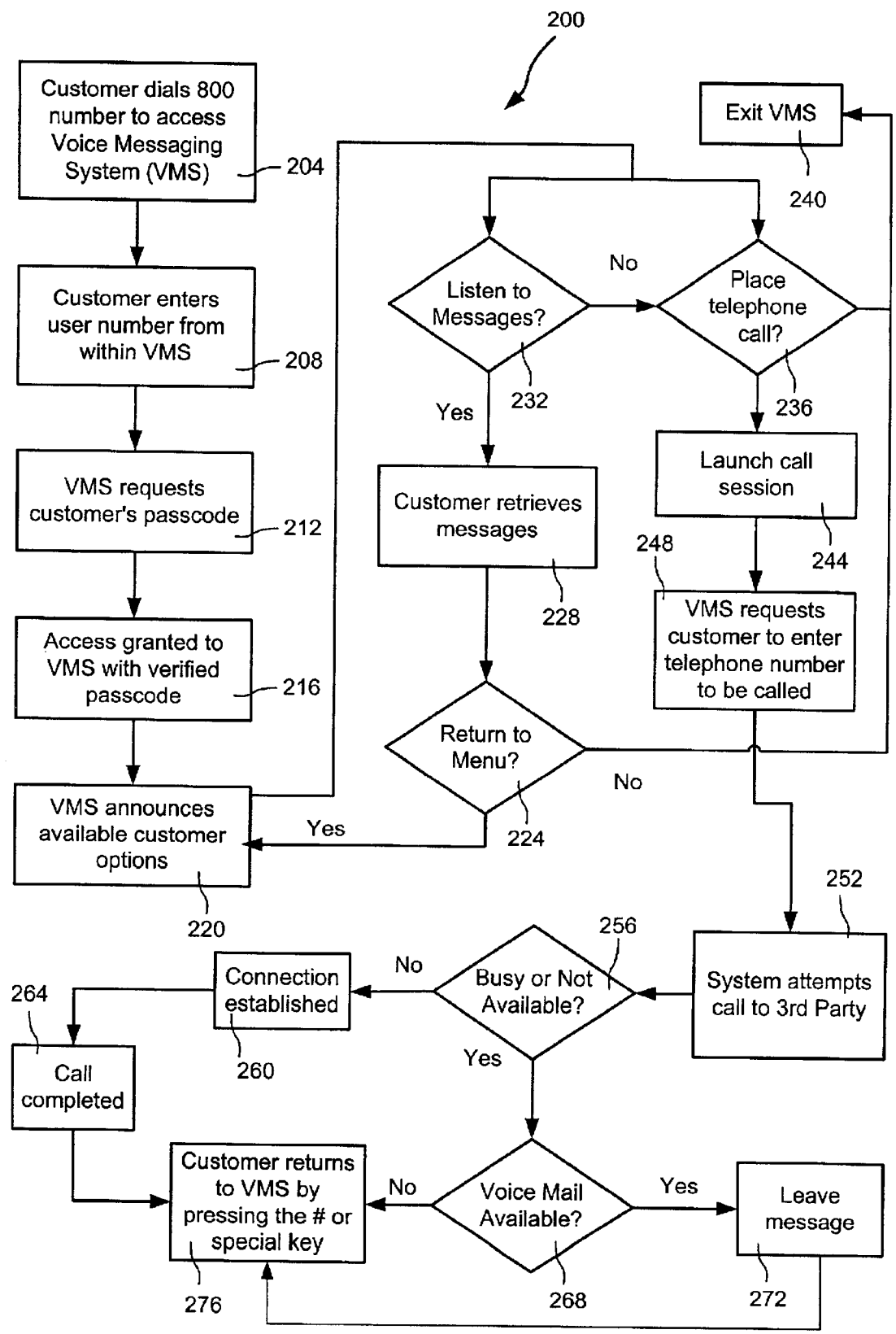
FIG. 2 is a flow chart illustrating a method for using a voice-messaging system to place local and long distance telephone calls.

Referring now to FIG. 2, one embodiment of a method for using a voice-messaging system to place local and long distance telephone calls is shown in flow chart 200. In the illustrated embodiment, a customer or user first dials a telephone number to access a voice-messaging system (step 204). The number may be a toll-free number, so the user can access the system from long distance locations without incurring long distance fees.

In one embodiment, the voice-messaging system prompts the user to enter a system access code (step 208). In another embodiment, the user can enter the system access code without the system prompting the user to enter it. The system access code, can be any user code associated with a voice-messaging account, and in one embodiment is the user's ten-digit home phone number. The voice-messaging system then prompts the user to enter a pass code for verification (step 212). A pass code can be any personalized identification number (PIN)-type code. After the voice-messaging system verifies the user pass code, it grants the user access to the different voice-messaging and calling features of the system (step 216), for example by providing the user with a main menu of options. In one embodiment, the interactive voice-response unit of the voice-messaging system announces the menu options to the user (step 220). But other means of notifying the user of the available options could be used, for example by text messaging, operator service, or the like.

In one embodiment, the voice-messaging system options available to the user include using the voice-messaging options (step 232) and placing a local or long distance phone call (step 236). As one skilled in the art will appreciate, voice-messaging options may include listening to messages, saving or deleting messages, leaving messages for other parties, returning a call a person who left a message, etc.

If, for example, the user chooses to listen to voice messages, the voice-messaging system retrieves those messages for the user to review (step 228). After the user is finished processing voice-messaging options, the user may return to the main menu (step 224), for example, by pressing a key on the telephone or stating the preferred option to the interactive voice-response unit. If the user chooses to return to the main menu, the voice-messaging system announces available user options again (step 220). Otherwise, the user exits the voice-messaging system (step 240). Other options not shown or discussed herein also may be available to the user.

If the user decides to place a phonecall, (step 236), a call session is started (step 244) and the voice-messaging system requests the user to enter the telephone number of the third party to be called (step 248). In the United States, the telephone number typically is a 7-digit or 10-digit number. But if the call is to a party in a different country, the number of digits needed to place a call in that country can be entered. The voice-messaging system then attempts to make a connection with the third-party number (step 252). In one embodiment, the user will hear a ringing tone as the system calls the third party, just as if the user was calling the third party directly. In another embodiment, no ringing tone will be heard.

If the connection with the third party is established (step 260), the user is connected with the third party. In one embodiment, this connection comprises establishing a 3-way call between the user, the voice-messaging system and the third-party telephone line. In yet another embodiment, the connection comprises establishing a direct connection between the user and the third-party telephone line, and the voice-messaging system disconnecting from the call. In one embodiment, the voice-messaging system will establish the direct connection between the user and the third-party telephone line before or while it disconnects from the call. In another embodiment, a switch or other device in the telephone system may establish the connection between the user and the third party and disconnect the voice-messaging system.

After the call is completed, (step 264), the user is offered the option to return to the voice-messaging system by entering a predetermined code. As one skilled in the art will appreciate, the code can be any code that the voice-messaging system is capable of recognizing, such as pressing a key like the "#" key or other pre-defined key, or by saying a command to the system when voice recognition is used. (step 276). If the user does not want to return to the voice-messaging system he/she can end the session by hanging-up the phone.

If the call made by the user is to a long distance number, the charges for the long distance call can be charged to the user's account, for example the user's home telephone account, which has voice-messaging services associated with it. Also, as one skilled in the art will appreciate, any billing rates may be used, such as the user's home long distance rates, the user's home long distance rates with a sur charge, or any other billing structure.

If the third-party line is busy or if the third party is unavailable (step 256), the user may leave a voice mail message with the third party (step 272) if the third party has voice mail capabilities or an answering machine (step 268). Otherwise, the user may return to the voice-messaging system (step 276). Alternatively, the user may simply terminate the call by hanging-up the phone (not shown). In addition, if the user leaves a message with the 3rd party, the user then can return to the voice-messaging system by entering a predetermined code as discussed above (step 276).

While the principles of the invention have been described above in connection one or more embodiments of specific systems and methods, it is to be clearly understood that this description is made only by way of example and does not limit the scope of the invention.

What is claimed is:

1. A method of using a voice messaging system to place a telephone call, comprising:

establishing a user account for a user, wherein the user account has associated with it pre-determined rates for placing telephone calls using the voice messaging system;

issuing the user an user-identification code and a password code associated with the user account;

providing the user a toll-free number by which to access the voice messaging system;

receiving a call from the user via the toll-free number;

verifying that the user is a valid subscriber for having voice messaging service by receiving and verifying the user-identification code and password code associated with the user account;

prompting voice messaging system options after said verifying;

receiving a request from the user to place a telephone call after said prompting;

receiving from the user the telephone number to call;

placing the call to the telephone number; and charging the user account of the user the pre-determined rates if the call is connected.

* * * * *